US012190349B2

(12) United States Patent
Mathur

(10) Patent No.: US 12,190,349 B2
(45) Date of Patent: Jan. 7, 2025

(54) SELECTING ADDITIONAL CONTENT FOR INCLUSION IN VIDEO DATA PRESENTED TO USERS VIA AN ONLINE SYSTEM

(71) Applicant: Facebook, Inc., Menlo Park, CA (US)

(72) Inventor: Abhishek Mathur, Menlo Park, CA (US)

(73) Assignee: Meta Platforms, Inc., Menlo Park, CA (US)

(*) Notice: Subject to any disclaimer, the term of this patent is extended or adjusted under 35 U.S.C. 154(b) by 183 days.

(21) Appl. No.: 14/989,726

(22) Filed: Jan. 6, 2016

(65) Prior Publication Data

US 2017/0193549 A1 Jul. 6, 2017

(51) Int. Cl.
G06Q 30/00 (2023.01)
G06Q 30/0251 (2023.01)
G06Q 30/0273 (2023.01)
H04L 65/60 (2022.01)
H04L 65/61 (2022.01)
H04L 67/561 (2022.01)
H04L 67/564 (2022.01)
H04L 67/63 (2022.01)

(52) U.S. Cl.
CPC ..... G06Q 30/0252 (2013.01); G06Q 30/0275 (2013.01); H04L 65/60 (2013.01); H04L 65/61 (2022.05); H04L 67/561 (2022.05); H04L 67/564 (2022.05); H04L 67/63 (2022.05)

(58) Field of Classification Search
CPC .......... G06Q 30/0242; G06Q 30/0277; G06Q 30/0252; G06Q 30/0275; H04L 67/63; H04L 65/61; H04L 67/564; H04L 67/561; H04L 30/0275; H04L 65/60
See application file for complete search history.

(56) References Cited

U.S. PATENT DOCUMENTS

| 10,032,191 | B2* | 7/2018 | Harrison | H04N 21/64322 |
| 2014/0241700 | A1* | 8/2014 | Gilley | G06Q 30/02 386/250 |
| 2015/0193814 | A1* | 7/2015 | Eppinger | G06Q 30/0242 705/14.41 |
| 2015/0254732 | A1* | 9/2015 | Snyder | G06Q 30/0277 705/14.72 |
| 2015/0324869 | A1* | 11/2015 | Harding | H04N 21/8455 705/14.73 |
| 2016/0249097 | A1* | 8/2016 | Shoykhet | H04N 21/23439 |

(Continued)

Primary Examiner — Alvin L Brown
(74) Attorney, Agent, or Firm — Greenberg Traurig, LLP

(57) ABSTRACT

A user provides video data to an online system for presentation to additional users of the online system. Additionally, the user provides information to the online system identifying positions in the information capable of presenting supplemental content items, which may be sponsored, and may provide information describing a context of the video data at the various positions capable of presenting the supplemental content items. For example, the information identifies one or more times within the video data at which an advertisement is capable of being presented via the video data. Based on the information provided by the user, the online system selects supplemental content items for presentation via the video data at the identified positions and presents the selected supplemental content items to additional users viewing the video data at the identified positions.

20 Claims, 2 Drawing Sheets

(56) References Cited

U.S. PATENT DOCUMENTS

2016/0371737 A1\* 12/2016 Lewis ................ G06Q 30/0269
2017/0180810 A1\* 6/2017 Ritter ............... H04N 21/25866
2018/0014047 A1\* 1/2018 Ruxton .............. H04N 21/4122
2019/0026790 A1\* 1/2019 Bayer .................... G06Q 30/02

\* cited by examiner

SELECTING ADDITIONAL CONTENT FOR INCLUSION IN VIDEO DATA PRESENTED TO USERS VIA AN ONLINE SYSTEM

BACKGROUND

This disclosure relates generally to online systems, and more specifically to presenting content to online system users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Increasingly, many online systems allow users to share video data with other users. For example, a user may provide video data to the online system, allowing other users to view the video data via the online system. The video data provided to the online system may be live video data or may be previously recorded or generated content. Distributing video data via an online system allows greater access to the video data. Additionally, by using information associated with other users by the online system, the user may identify specific groups of users (e.g., users associated with particular characteristics by the online system or users connected to the user via the online system), allowing the user to provide the video data to users most likely to have an interest in the video data.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting online system users with certain types of sponsored content provided by the user. Frequently, online systems charge a user for each presentation of sponsored content to an online system user or for each interaction with sponsored content by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item (e.g., visits a physical location associated with the user who provided the content item).

Users providing video data to other users via the online system may include sponsored content in the video data. For example, other users provide sponsored content to the online system, and a user providing video data includes portions of the sponsored content in the video data provided by the user. Another user providing sponsored content that is presented in the video data provided by the user may provide compensation to the user providing the video data in exchange for presentation of the other user's sponsored content in the user's video data, allowing the user to generate revenue from providing video data via the online system.

However, video data provided to the online system by a user typically does not include breaks or other locations in which sponsored content may be presented without distracting from the video data. For example, if the video data provided to the online system presents a live event or live content, inserting sponsored content into the video data may preempt or obscure portions of the video data from other users. Additionally, subject matter of video data presenting a live event is often unpredictable, making it difficult to include sponsored content in the video data that is relevant to the video data itself, so including sponsored content in video data may distract users from the video data, reducing user engagement or interest in the video data.

SUMMARY

An online system receives video data from a user and allows other users to view the video data via the online system. For example, the online system includes video data from the user in one or more content items presented to the other users by the online system. As another example, the online system maintains a page of content provided by the user to the online system, and presents the video data provided by the user to other users who view or who otherwise access the page of content provided by the user to the online system. The online system may include one or more sponsored content items, such as other video data, associated with users in the video data received from the user, allowing the online system to obtain revenue from users associated with sponsored content items presented in the video data provided by the user. For example, the online system receives compensation from users associated with sponsored content items presented in video data provided by a user, but does not request compensation from the user who provided the video data to encourage users to provide video data to the online system.

To allow inclusion of sponsored content items from other users into video data provided to the online system by a user while minimizing disruption of the video data by presenting one or more of the sponsored content items, the online system receives information from the user providing the video data that indicates positions in the video data eligible for presenting sponsored content items. For example, the user providing the video data specifies one or more times in the video data in which sponsored content is eligible to be presented. As another example, the user providing the video data to the online system identifies a time in the video data and a duration from the identified time, so advertisements are capable of being presented in the video data during times within the identified duration form the identified time. Additionally, the user providing the video data specifies a context of video data associated with a time in the video data eligible for presenting a sponsored content item. As an example, the user providing the video data to the online system identifies a time in the video data in which a sponsored content item is eligible to be presented and specifies keywords describing content of the video data within a threshold time interval of the identified time (e.g., within a threshold interval of the identified time, within a time interval from a time when a sponsored content item was previously shown via the video data and the identified time, within a time interval from a start of the video and the identified time). Alternatively, the user providing the video data to the online system identifies the time in the video data in which a sponsored content item is eligible to be presented and identifies a specific sponsored content item for presentation via the video data at the identified time; for example, the user providing the video data to the online system identifies a time within the video data and an identifier associated with a specific sponsored content item to present the specific sponsored content item at the identified time within the video data.

Based on the information received from the user providing the video data, the online system selects one or more sponsored content items for presentation via the video data at a time in the video data identified by the user providing the video data. For example, the online system identifies various candidate sponsored content items based on information received from the user (e.g., keywords) and selects a sponsored content item from the candidate sponsored content items based at least in part on amounts of compensation received by the online system for presenting different candidate sponsored content items (i.e., based at least in part on bid amounts associated with each candidate sponsored content item, with a bid amount associated with a candidate sponsored content item specifying an amount of compensation provided to the online system in exchange for presentation of or for interaction with the candidate sponsored content item). As an example, the candidate sponsored content items are sponsored content items that include a keyword received from the user providing the video data as targeting criteria included in the sponsored content items. In some embodiments, the online system also selects the sponsored content item based at least in part on information associated with an additional user viewing the video data. For example, the online system identifies candidate sponsored content items including at least a threshold number of targeting criteria satisfied by characteristics of the additional user (e.g., geographic location of the additional user, gender of the additional user, age of the additional user, etc.), and selects a sponsored content item from the candidate sponsored content items based at least in part on amounts of compensation received by the online system for presenting different sponsored content items. If the information received from the user identifies a specific sponsored content item, the online system retrieves the specific sponsored content item for presentation via the video data at the identified time.

The online system subsequently presents the selected sponsored content item via the video data at the identified time. Different types of sponsored content items may be differently presented via the video data. For example, if the selected sponsored content item includes video data, video data from the sponsored content is inserted into or otherwise interleaved with the video data provided by the user at the identified time of the video data. As another example, if the selected sponsored content item includes text or image data, the text or image data from the selected sponsored content item is overlaid onto the video data at the identified time of the video data.

In various embodiments, the online system also captures various interactions by additional users viewing the video data and communicates information describing the interactions to the user who provided the video data. For example, the online system captures interactions by additional users viewing the video data identifying indications of preference for the video data by additional users, sharing of the video data with other additional users by an additional user, comments provided to the online system and associated with the video data, modifications to playback of the video data by additional user (e.g., pausing the video data, muting the video data, increasing volume of the video data, etc.). Information describing interactions with the video data by additional users viewing the video data allows the user who provided the video data to the online system to analyze interactions with the video data over time by other users, which may allow the user who provided the video data to determine how presenting sponsored content at different times in the video data affects user interaction with the video data. The user may initially provide video data of a live event to the online system and maintain the video data on the online system after the live event has concluded, allowing other users to subsequently view the video data after the live event has concluded via the online system. In some embodiments, the user who provided the video data to the online system provides the online system with alternative times in the video data for presenting sponsored content in the video data to users who view the video data after a live event captured by the video data has concluded. The user may account for user interactions with the video data during the live event when determining alternative times in the video data for presenting sponsored content if the video data is viewed after the live event has ended. For example, if information describing interaction with the video data by additional users decreased at a particular time in the video data during a live event, the user identifies an alternative time prior to the particular time for presenting sponsored content in the video data after the live event to increase a likelihood of another user viewing the video data after the live event viewing the sponsored content item. Similarly, the user who provided the video data may specify alternative contexts for presenting sponsored content items when the video data is viewed after a live event captured by the video data concludes. For example, the user who provided the video data specifies different sponsored content items for presentation after the live event captured by the video data has concluded than when the live event is presented by the video data. As another example, the user who provided the video data specifies different keywords for selecting sponsored content items at times in the video data when the video data is viewed after a live event captured by the video data has concluded.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
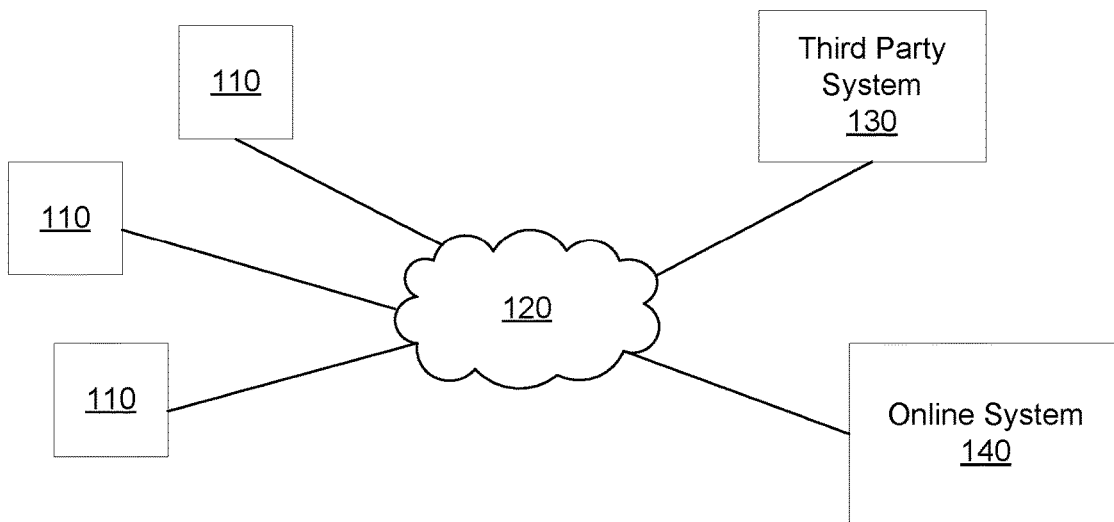
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 to the online system 140 in exchange presenting the advertisements to the online system 140. Content presented by the online system 140 for which the online system 140 receives compensation in exchange for presenting is referred to herein as "sponsored content," "sponsored content items," or "advertisements." Sponsored content from a third party system 130 may be associated with the third party system 130 or with another entity on whose behalf the third party system 130 operates.

Figure 2:
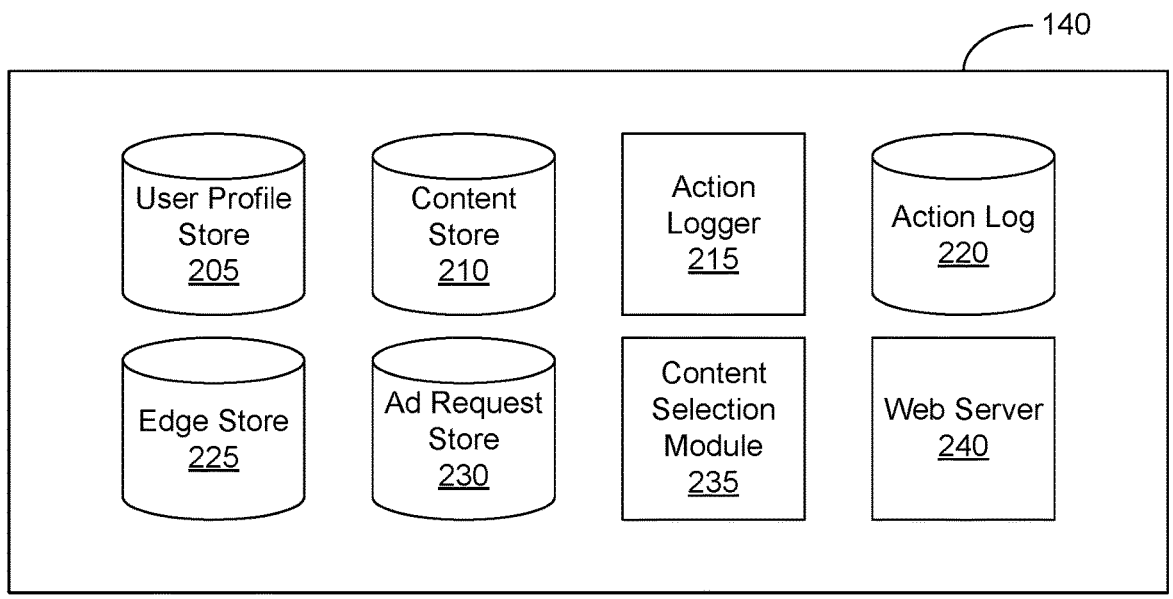
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. In various embodiments, the content store 210 includes video data provided by a user to the online system 140. The video data may capture a live event, allowing various users to view the live event by accessing the video data via the online system 140. Additionally, the online system 140 may maintain video data that captured a live event in the content store 210 after the live event concludes, subsequently allowing online system users to retrieve the video data and view the captured live event after the conclusion of the live event. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S.

patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 140 if an advertisement in the ad request is presented to a user, if the advertisement in the ad request receives a user interaction when presented, or if any suitable condition is satisfied when the advertisement in the ad request is presented to a user. For example, the bid amount specifies a monetary amount that the online system 140 receives from the advertiser if an advertisement in an ad request is displayed. In some embodiments, the expected value to the online system 140 of presenting the advertisement may be determined by multiplying the bid amount by a probability of the advertisement being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user and selects content items based on the retrieved information. For example, information describing actions associated with other users connected to the user or other data associated with users connected to the user is retrieved and used to select content items describing actions associated with one or more of the other users. Additionally, one or more ad requests may be retrieved from the ad request store 230. The retrieved ad requests and other content items are analyzed by the content selection module 235 to identify candidate content items that are likely to be relevant to the user. For example, content items associated with users who not connected to the user or content items associated with users for whom the user has less than a threshold affinity are discarded as candidate content items. Based on various criteria, the content selection module 235 selects one or more of the candidate content items or ad requests identified as candidate content items for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

When video data provided by a user to the online system 140 is presented to an additional user of the online system 140, the content selection module 235 may select one or more ad requests from the ad request store 230 that include advertisements for presentation via the video data at different positions. To include advertisements in video data provided by the user while minimizing disruption of interaction with the video data, the content selection module 235 receives information from the user providing the video data to the online system 140 indicating positions in the video data capable of presenting an advertisement. For example, the user communicates information to the content selection module 235 identifying a time in the video data during which an advertisement is capable of being presented or identifying a time in the video data and a duration after the identified time during which one or more advertisements are capable of being presented. Additionally, the information received from the user who provided the video data to the online system 140 may also include information for selecting an ad request including an advertisement for presentation via the video data at an identified time. For example, the received information includes an identifier of a specific ad request in association with an identified time in the video data to present an advertisement from the specific ad request at the identified time in the video data. Alternatively, the received information includes information describing a context of the video data at an identified time capable of presenting an advertisement. For example, the received information identifies one or more keywords associated with an identified time of the video data, so the content selection module 235 selects an ad request including at least a threshold amount of targeting criteria satisfied by the keywords for presentation at the identified time. Additionally, the content selection module 235 may select an ad request for presentation at the identified time based at least in part on characteristics of an additional user presented with the video data by identifying one or more ad requests including at least a threshold amount of targeting criteria satisfied by received information from the user and characteristics associated with the additional user maintained by the online system 140. Selection of advertisements for presentation via video data provided by a user to the online system 140 is further described below in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Including Advertisements in Video Data Provided to the Online System by a User

Figure 3:
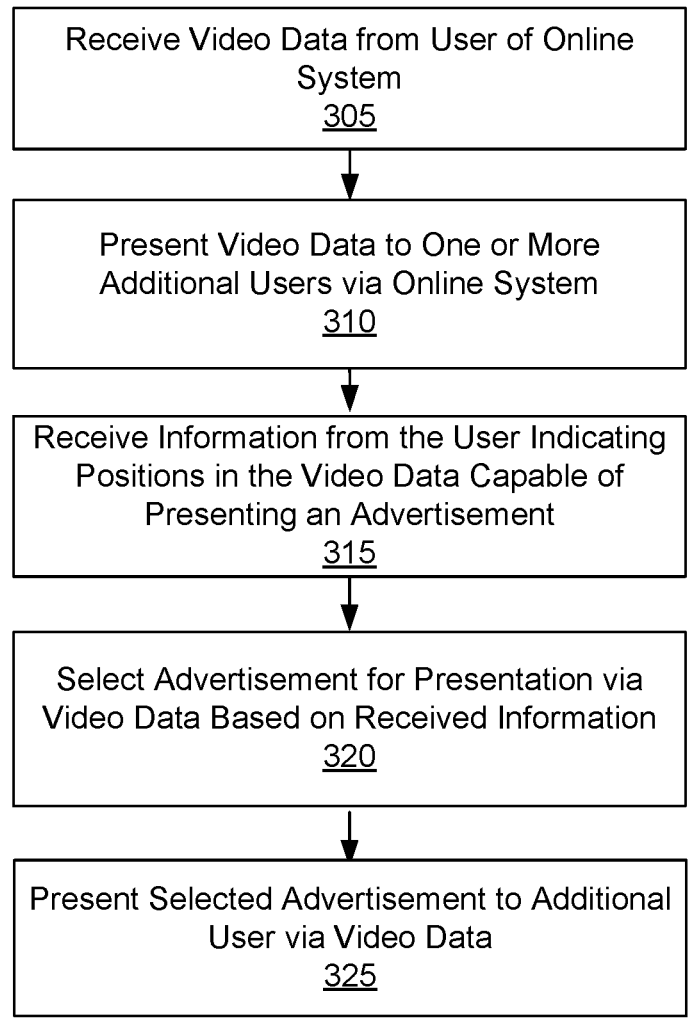
FIG. 3 is a flowchart of a method for including advertisements in video data provided to an online system by a user for presentation to additional users, in accordance with an embodiment.

FIG. 3 is a flowchart of one embodiment of a method for including advertisements in video data provided to an online system 140 by a user for presentation to additional users. In other embodiments, the method may include different and/or additional steps than those shown in FIG. 3. Additionally, steps of the method may be performed in different orders than the order described in conjunction with FIG. 3 in various embodiments.

The online system 140 receives 305 video data from a user of the online system. For example, the video data captures a live event as the event is happening. As another example, the video data received from the user captured an event that has concluded, such as a live event that has ended. The online system 140 presents 310 the video data from the user to one or more additional users of the online system. For example, the online system 140 includes the video data from the user in one or more content items selected for an additional user and presented to the additional user via the online system 140, such as described further above in conjunction with FIG. 2. As another example, the online system 140 maintains a page of content provided to the online system 140 by the user and includes the video data on the page of content, so the video data is presented 310 to additional users viewing or otherwise accessing the page of content provided to the online system 140 by the user. This allows the user to distribute the video data to additional users via the online system 140.

Additionally, the online system 140 receives 320 information from the user indicating positions in the video for presenting advertisements, such as times within the video data during which an advertisement is eligible for presentation. The received information allows advertisements to be included in the video data provided to the online system 140 by the user minimizing disruption of the video data by presentation of the advertisements, which may decrease interaction or engagement with the video data by an additional user viewing the video data. While FIG. 3 shows an example where the online system 140 receives 315 the information indicating positions in the video data capable of presenting advertisements after the video data is being presented 310 to one or more additional users, in other embodiments the online system 140 receives 315 the information indicating positions in the video data capable of presenting advertisements when the video data is received 305 or after receipt 305 of the video data from the user and prior to presenting 310 the video data to one or more additional users.

In various embodiments, the received information identifies a time in the video data during which an advertisement is capable of being presented. Additionally, the received information may identify a time and a duration subsequent to the identified time to indicate that advertisements are capable of being presented via the video data within the identified duration from the identified time. The received information may also include information describing a context of the video data associated with which an identified time during which an advertisement is capable of being presented in the video data. For example, the received information identifies a context by specifying one or more keywords or topics associated with the video data or other suitable information. As a specific example, the received information identifies a time in the video data in which an advertisement is eligible to be presented and specifies keywords describing content of the video data within a threshold time interval of the identified time (e.g., within a threshold interval of the identified time, within a time interval from a time when a sponsored content item was previously shown via the video data and the identified time, within a time interval from a start of the video and the identified time). Alternatively, the received information identifies a time in the video data capable of presenting an advertisement and identifies a specific advertisement to present via the video data at the identified time. For example, the received information includes a time within the video data and an identifier associated with an advertisement request that includes a specific advertisement for presentation via the video data at the identified time.

Based on the information received from the user providing the video data, the online system 140 selects 320 one or more advertisements for presentation via the video data at a time in the video data identified by the received information. In one embodiment, the online system 140 selects 320 the one or more advertisements when the time in the video data identified by the received information is reached during presentation of the video data to an additional user. Alternatively, the online system 140 selects 320 the one or more advertisements when the online system 140 receives 325 the information indicating the positions in the video data capable of presenting an advertisement and stores information identifying the selected advertisements in association with the positions in the video data. For example, the online system 140 associates an identifier of an ad request including an advertisement for presentation with a time in the video data capable of presenting an advertisement identified by the received information. If the received information identifies a specific advertisement for presentation at an identified time within the video data, the online system 140 selects 320 the specified advertisement identified from the received information for presentation at the identified time.

If the received information identifies a context of the video data for presenting advertisements during an identified time rather than identifying a specific advertisement for presentation, the online system 140 selects 320 an advertisement for presentation via the video data at the identified time based at least in part on the context included in the received information. In one embodiment, the online system 140 identifies candidate ad requests that include targeting criteria satisfied by the context included in the received information, such as ad requests including targeting criteria identifying topics or keywords satisfied by keywords included in the received information (e.g., topics or keywords matching keywords in the received information, topics or keywords associated with keywords in the received information). The candidate ad requests may be identified based at least in part on information associated with an additional user viewing the video data to whom the advertisement is to be presented. For example, the online system 140 identifies candidate ad requests as ad requests including at least a threshold number or percentage of targeting criteria satisfied by characteristics of the additional user or by the received information. Example characteristics of the additional user for identifying candidate ad requests include: a geographic location of the additional user, a gender of the additional user, an age of the additional user, an employment history of the additional user, interests of the additional user, or other suitable characteristics of the additional user. As an example, the online system 140 identifies candidate ad requests for presentation to an additional user at an identified time in the video data as ad requests having targeting criteria including a keyword satisfied by one or more keywords included in the received information, a location within a threshold distance of a geographic location of the additional user, and an age range including an age of the additional user. Using characteristics of an additional user viewing the video data to identify candidate ad requests allows the online system 140 to present different, and more personalized, advertisements to different additional users viewing the video data, which may increase a likelihood of an additional user interacting with an advertisement presented via the video data by personalizing advertisements presented via the video data for different additional users.

The online system 140 selects 320 an advertisement for presentation at the identified time via the video data from the candidate ad requests. As further described above in conjunction with FIG. 2, in various embodiments, the online system 140 ranks the candidate ad requests based at least in part on their bid amounts and selects 320 an ad request having at least a threshold position in the ranking. For example, the online system 140 determines expected values for each candidate ad request, with an expected value for a candidate ad request based on a likelihood of the additional user interacting with an advertisement from the candidate ad request and a bid amount included in the candidate ad request. The online system 140 ranks the candidate ad requests based on their expected values and selects 320 a candidate ad request having at least a threshold position in the ranking. Alternatively, the online system 140 selects 320 a candidate ad request having at least a threshold expected value.

An advertisement from the selected ad request is presented 325 to the additional user via the video data. For example, if the advertisement in the selected ad request includes video data, the online system 140 inserts the video data from the advertisement into the video data at the identified time by interleaving the video data from the advertisement with the video data provided by the user. As another example, if the advertisement includes text or image data, the online system 140 overlays the text or image data from the advertisement onto the video data at the identified time to present 325 the advertisement from the selected ad request to the additional user.

In various embodiments, the online system 140 also captures various interactions by additional users presented 310 with the video data and stores information describing the interactions by the additional users. For example, the online system 140 receives information from client devices 110 presenting 310 the video data to various additional users identifying interactions with the video data by the additional users via the client devices 110 and stores descriptions of interactions by additional users with the video data in association with the additional users. Example interactions by an additional user with the video data include: indicating a preference for the video data, sharing of the video data with another user, providing a comment on the video data to the online system 140, modifying playback of the video data (e.g., pausing the video data, muting the video data, increasing volume of the video data, etc.), and any other suitable information. In some embodiments, the online system 140 analyzes content of comments associated with the video data provided to the online system 140 to determine perception of the video data by various additional users. For example, the online system 140 performs sentiment analysis of text data in comments associated with the video data by an additional user to determine the additional user's sentiment towards the video data. The online system 140 may associate times with various interactions by an additional user and correlate times when the additional user performed various interactions with times within the video data, allowing the online system 140 to identify interactions performed by different additional users at different times within the video data. The online system 140 may receive information describing interactions by additional users from each client device 110 that presents the video data to an additional user or may receive information describing interactions by additional users from client devices 110 associated with a subset of the additional users to whom the video data is presented.

To allow the user providing the video data to the online system 140 to evaluate viewing of the video data, the online system 140 may provide the information describing interactions by additional users with the video data to the user providing the video data to the online system 140. Based on the interactions with the video data over time by additional users, the user may identify portions of the video data prompting user interactions, as well as changes in engagement with the video data by additional users as the video data is presented. For example, the online system 140 communicates information indicating a number of different types of interactions performed by additional users viewing the video data at different times in the video data to the user who provided the video data to the online system 140, allowing the user to analyze how additional users interacted with or engaged with the video data as the video data was presented.

The user may initially provide video data of a live event to the online system 140, and maintain the video data on the online system 140 after the live event has ended, allowing additional users to view the video data that recorded the live event after the live event has concluded. In some embodiments, the online system 140 also receives additional information from the user who provided the video data to the online system 140 identifying alternative times in the video data for presenting sponsored content if the video data is presented 310 to an additional user after conclusion of a live event captured by the video data. Similarly, the user who provided the video data to the online system 140 may identify alternative contexts for advertisements or alternative ad requests including advertisements for presentation at times in the video data that are identified by the received data (or at times that are identified in additional information received by the online system 140 from the user who provided the video data to the online system 140) if the video data is presented 310 to an additional user after a live event captured by the video data has concluded. This allows the user who provided the video data to the online system 140 to identify different times in the video capable of presenting advertisements after a live event captured in the video has concluded or to identify different advertisements or contexts for advertisements via the video data when the video data is presented 310 after conclusion of a live event captured by the video data. The user who provided the video data to the online system 140 may account for user interactions with the video data by additional users presented 310 with the video data during the live event captured by the video data when determining alternative times in the video data for presenting advertisements or alternative contexts for selecting advertisements if the video data is presented 310 after the live event has ended. For example, if interaction with the video data by additional users decreased at a particular time in the video data during a live event captured by the video data, the user identifies an alternative time prior to the particular time to present an advertisement via the video data when the video data is presented 310 after completion of the live event to increase a likelihood of a user viewing the video data after completion of the live event being presented with the advertisement. As another example, the user who provided the video data identifies alternative ad requests including advertisements for presentation after the live event captured by the video data has concluded than ad requests including advertisements for presentation when the live event is presented by the video data. In another example, the user who provided the video data specifies different keywords for selecting ad requests including advertisements for presentation at times in the video data when the video data is presented to an additional user after conclusion of a live event captured by the video data. after a live event captured by the video data has concluded.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
   at least one physical processor; and
   physical memory comprising computer-executable instructions that, when executed by the at least one physical processor, cause the at least one physical processor to perform acts comprising:
   receiving video data from a user of an online system;
   receiving information from the user, the information identifying a plurality of positions within the video data capable of presenting one or more advertisements via the video data, wherein the received information identifies a context at each of the identified positions in the video data;
   presenting the video data to an additional user of the online system via the online system;
   selecting a first advertisement request including an advertisement for presentation via the video data at a first identified position in the video data corresponding to a first context based at least in part on the received information and on:
      retrieving characteristics of the additional user maintained by the online system;
      selecting a plurality of candidate advertisement requests based on the first context at the first identified position in the video data;
      determining a relevance score for each of the plurality of candidate advertisement requests based on the retrieved characteristics of the additional user; and
      selecting an advertisement request from the plurality of candidate advertisement requests based on the determined relevance scores;
   selecting a second advertisement request including an advertisement for presentation via the video data at a second identified position in the video data corresponding to a second context based at least in part on the second context; and
   presenting the advertisement of the selected first advertisement request to the additional user via the video data at the first identified position in the video data and the advertisement of the selected second advertisement request to the additional user via the video data at the second identified position in the video data.

2. The system of claim 1, wherein the first identified position in the video data comprises times within the video data.

3. The system of claim 1, wherein at least one of the first identified position or the second identified position in the video data comprises a time within the video data and a duration subsequent to the time within the video data.

4. The system of claim 1, wherein the first context of the video data corresponding to the first identified position in the video data comprises one or more keywords associated with the first identified position.

5. The system of claim 4, wherein selecting candidate advertisement requests further comprises:
   selecting candidate advertisement requests including at least a threshold amount of targeting criteria satisfied by the one or more keywords.

6. The system of claim 1, wherein the received information identifies a specific advertisement request associated with the first identified position in the video data.

7. The system of claim 6, wherein selecting the first advertisement request including the advertisement for presentation via the video data at the first identified position in the video data corresponding to the first context based at least in part on the received information comprises:
   selecting the specific advertisement request for presentation via the video data at the first identified position in the video data.

8. The system of claim 1, wherein the video data captures a live event.

9. The system of claim 8, wherein receiving information from the user identifying the plurality of positions in the video data capable of presenting one or more advertisements via the video data comprises:
   receiving information from the user identifying the plurality of positions in the video data capable of presenting one or more advertisements while the live event is ongoing; and
   receiving information from the user identifying the plurality of positions in the video data capable of presenting one or more advertisements after the live event has concluded.

10. The system of claim 9, wherein the information from the user identifying the plurality of positions in the video data capable of presenting one or more advertisements while the live event is ongoing identifies one or more times in the video data and the information from the user identifying the plurality of positions in the video data capable of presenting one or more advertisements after the live event has concluded identifies one or more alternative times in the video data.

11. The system of claim 9, wherein the information from the user identifying the plurality of positions in the video data capable of presenting one or more advertisements while the live event is ongoing identifies a context of the video data associated with the first identified position in the video data and the information from the user identifying one or more positions in the video data capable of presenting one or more advertisements after the live event has concluded identifies an alternative context associated with the first identified position in the video data.

12. The system of claim 9, wherein the plurality of positions in the video data capable of presenting one or more advertisements after the live event has concluded are determined based at least in part on interactions by one or more additional users presented with the video data while the live event is ongoing.

13. A computer program product comprising a non-transitory computer readable storage medium having instructions encoded thereon that, when executed by a processor, cause the processor to:
receive video data from a user of an online system;
receive information from the user, the information identifying a plurality of positions within the video data capable of presenting one or more advertisements via the video data, wherein the received information identifies a context at each of the identified one or more positions in the video data;
present the video data to an additional user of the online system via the online system;
select a first advertisement request including an advertisement for presentation via the video data at a first identified position in the video data corresponding to a first context based at least in part on the received information and on:
retrieving characteristics of the additional user maintained by the online system;
selecting a plurality of candidate advertisement requests based on the first context at the first identified position in the video data;
determining a relevance score for each of the plurality of candidate advertisement requests based on the retrieved characteristics of the additional user; and
selecting an advertisement request from the plurality of candidate advertisement requests based on the determined relevance scores;
selecting a second advertisement request including an advertisement for presentation via the video data at a second identified position in the video data corresponding to a second context based at least in part on the second context; and
present the advertisement of the selected first advertisement request to the additional user via the video data at the first identified position in the video data and the advertisement of the selected second advertisement request to the additional user via the video data at the second identified position in the video data.

14. The computer program product of claim 13, wherein the first identified position in the video data comprises times within the video data.

15. The computer program product of claim 13, wherein at least one of the first identified position or the second identified position in the video data comprises a time within the video data and a duration subsequent to the time within the video data.

16. The computer program product of claim 13, wherein the first context of the video data corresponding to the first identified position in the video data comprises one or more keywords associated with the first identified position.

17. The computer program product of claim 16, wherein select candidate advertisement requests further comprises:
select candidate advertisement requests including at least a threshold amount of targeting criteria satisfied by the one or more keywords.

18. The system of claim 1, wherein the first context and the second context are different contexts.

19. The computer program product of claim 13, wherein the first context and the second context are different contexts.

20. A method comprising:
receiving video data from a user of an online system;
receiving information from the user, the information identifying a plurality of positions within the video data capable of presenting one or more advertisements via the video data, wherein the received information identifies a context at each of the identified positions in the video data;
presenting the video data to an additional user of the online system via the online system;
selecting a first advertisement request including an advertisement for presentation via the video data at a first identified position in the video data corresponding to a first context based at least in part on the received information and on:
retrieving characteristics of the additional user maintained by the online system;
selecting a plurality of candidate advertisement requests based on the first context at the first identified position in the video data;
determining a relevance score for each of the plurality of candidate advertisement requests based on the retrieved characteristics of the additional user; and
selecting an advertisement request from the plurality of candidate advertisement requests based on the determined relevance scores;
selecting a second advertisement request including an advertisement for presentation via the video data at a second identified position in the video data corresponding to a second context based at least in part on the second context; and
presenting the advertisement of the selected first advertisement request to the additional user via the video data at the first identified position in the video data and the advertisement of the selected second advertisement request to the additional user via the video data at the second identified position in the video data.

* * * * *